Dec. 14, 1954     H. W. CLARKE     2,696,813
ROTARY DISH HEATER
Filed Aug. 24, 1951     3 Sheets-Sheet 1
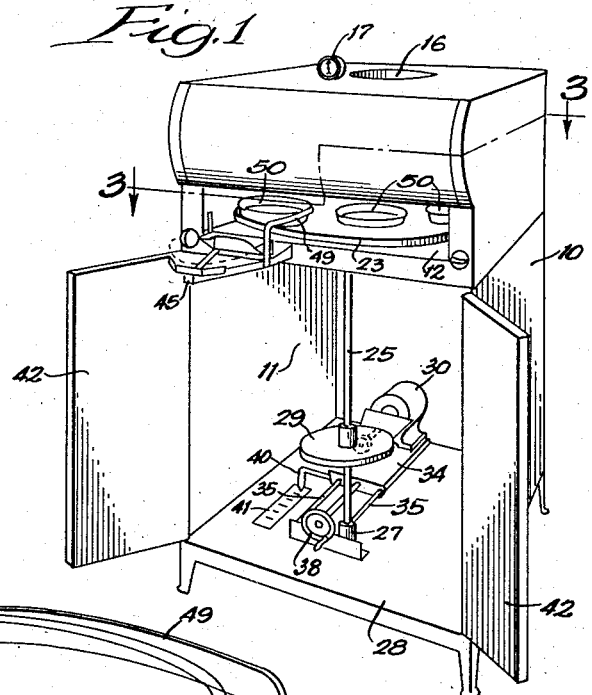
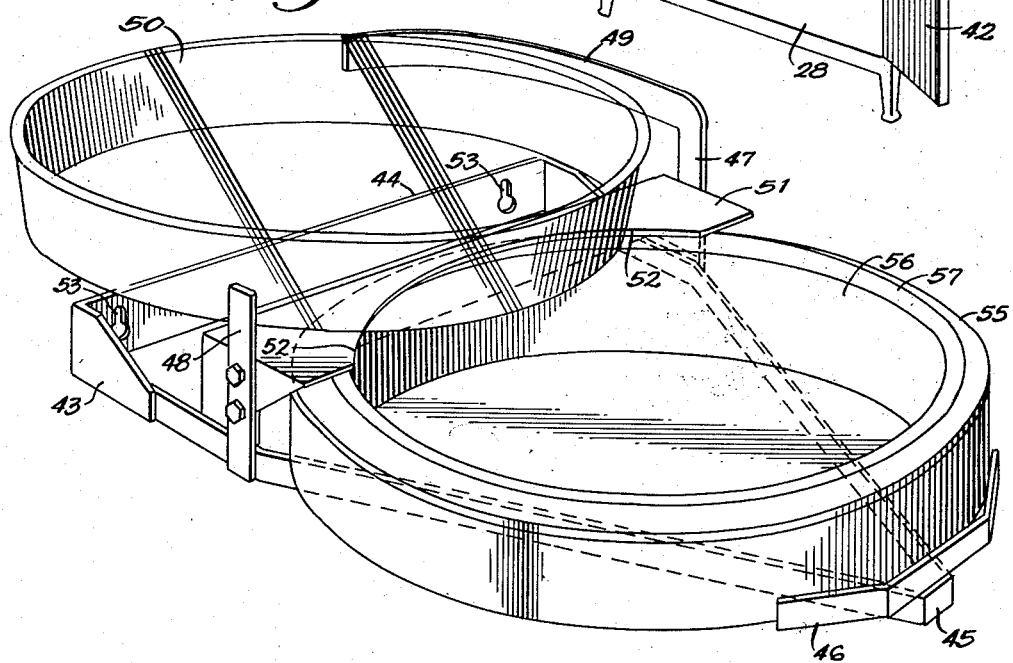
INVENTOR:
Houghton W. Clarke,
BY
Dawson & Orms,
ATTORNEYS.

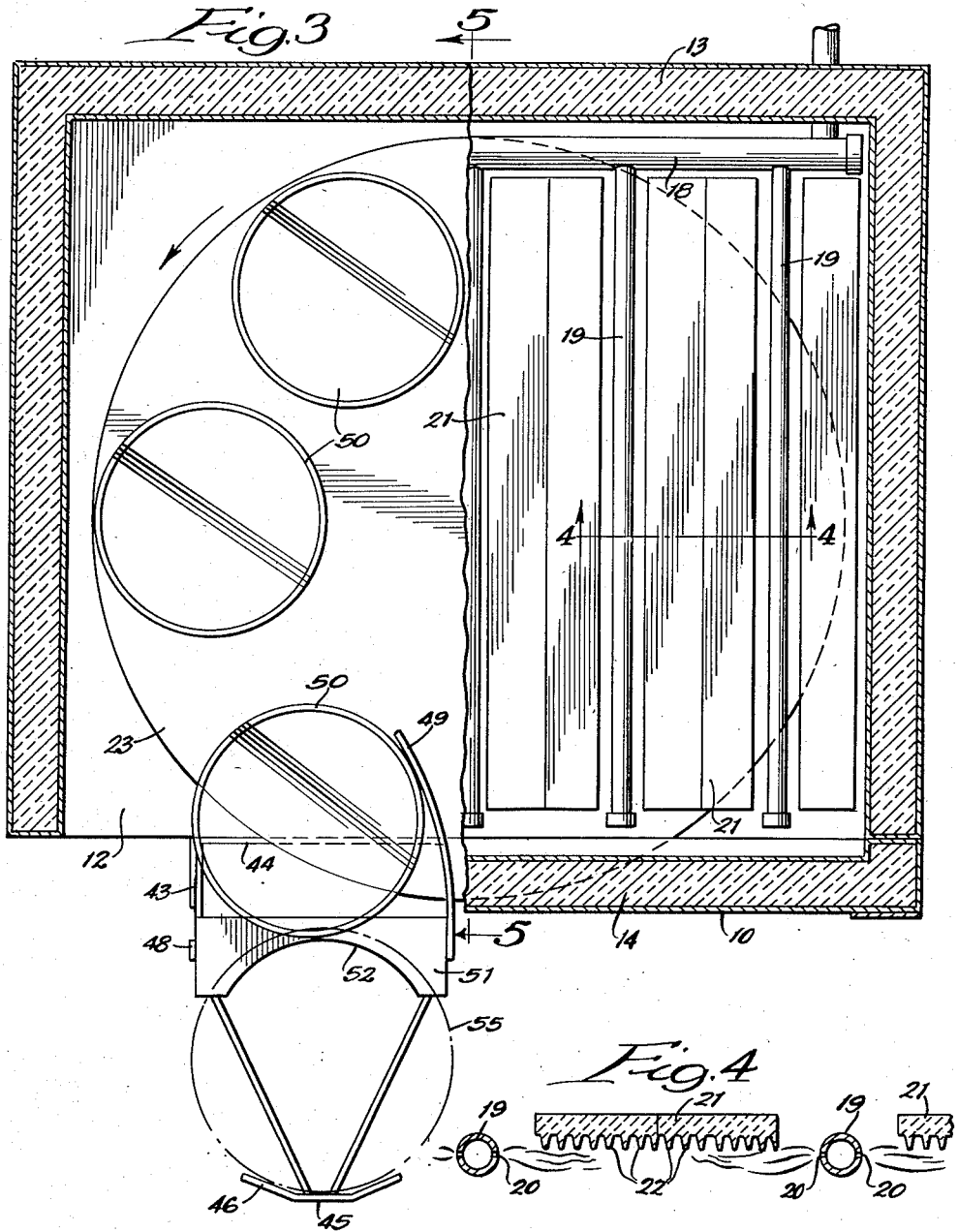

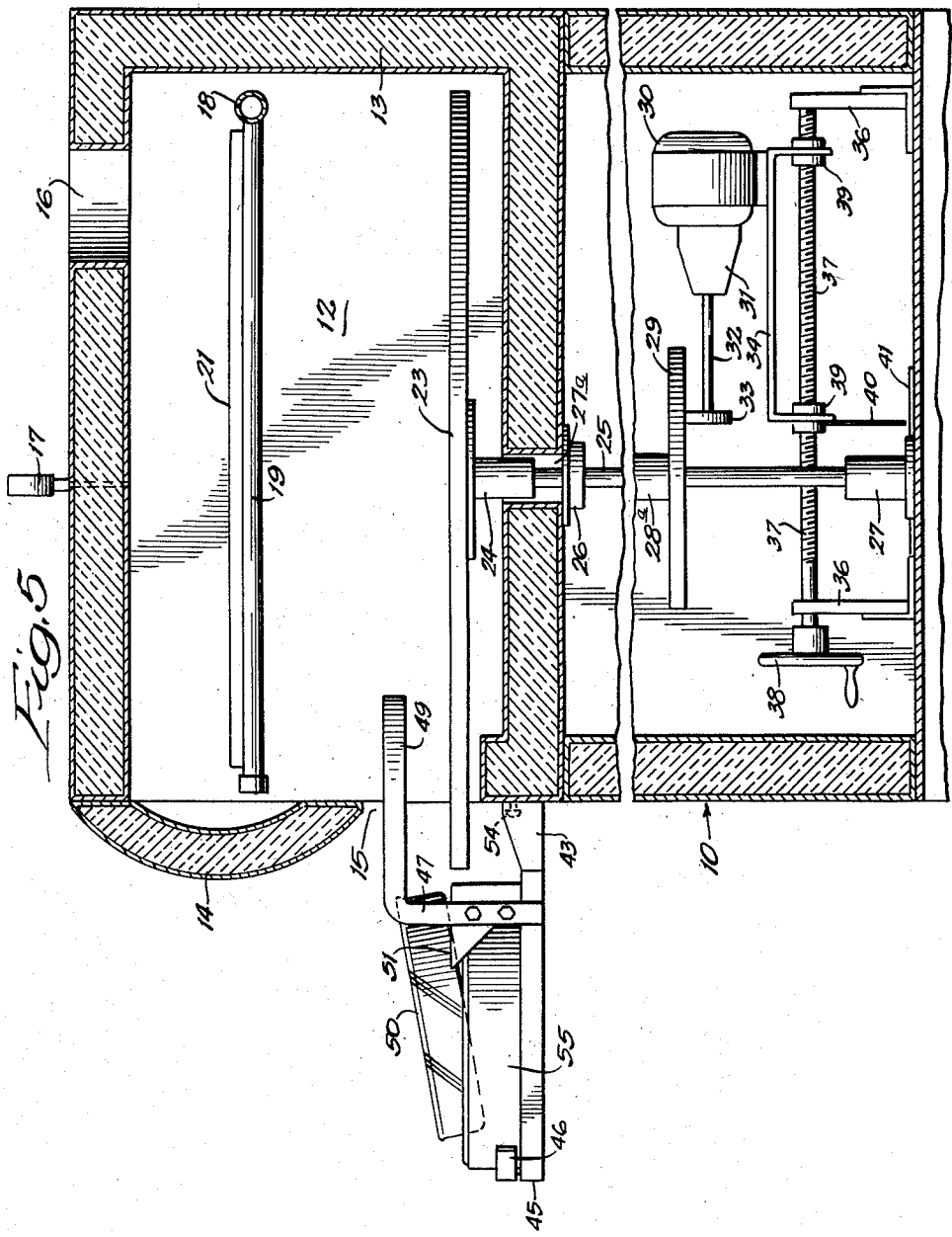

United States Patent Office 2,696,813
Patented Dec. 14, 1954

2,696,813

ROTARY DISH HEATER

Houghton W. Clarke, Evanston, Ill., assignor to Mealpack Corporation, Evanston, Ill., a corporation of Illinois Application August 24, 1951, Serial No. 243,415

6 Claims. (Cl. 126—246)

This invention relates to a dish heater and to means for storing in heavy heat-resistant dishes a quantum of heat effective for maintaining foods within insulated containers in hot condition for prolonged periods of time.

The present invention is related to my copending application Serial No. 757,841 filed June 28, 1947, for a Dish.

As shown more clearly in the above co-pending application, I provide Pyrex or heat-resistant dishes which are adapted to be heated for the storing of heat therein and the dishes are filled with hot food and sealed within insulated containers to maintain the food in a heated condition for a desired period of time. The dishes, which may be of heavy, transparent heat-resistant glass, such as Pyrex, are preferably transparent and are adapted to receive infra-red rays for the storing of heat therein, but the quantum of heat with which a given dish is to be charged will depend upon the length of time that the food is to be stored in hot condition, the character of the food itself, and other conditions. If a meal is to be served fairly promptly, as, for example, in a hospital, it may be that the time for keeping the food hot is considerably shorter than where the food is to be delivered to some distant point, as, for example, at a factory, a number of hours later. Because the dishes are filled in a packing line, it is often necessary that the dishes be heated as quickly as possible to the desired temperature and delivered, for example, at rates of 200 to 480 per hour. Overheating of the dishes may be as detrimental as underheating, and it is important that means be provided for giving each dish a predetermined charge of heat.

A problem is further presented in the handling of the heat-charged dishes after leaving the heating zone and in attempting to utilize the charged heat therein as promptly as possible while at the same time facilitating the handling of the heated dishes and the assembly thereof with the insulated container bottom.

An object of the present invention is to provide apparatus for effectively charging containers of heat-resistant material with a desired quantum of heat while delivering them at the desired rate to the packing line. A further object is to provide apparatus for the effective charging of heat-resistant containers with a predetermined quantum of heat while removing the container from the heat zone precisely after it has received such predetermined amount of heat and assembling the heated dish automatically with its insulated container bottom so that the heat of the dish immediately is imparted to this insulated portion of the container. Yet another object is to provide a foolproof structure which prevents the exposure of dishes to the heat beyond a selected period and while automatically removing a dish after the same has been charged with heat to a predetermined extent. Another object is to provide a heat zone with means for regulating the same and maintaining it at a predetermined temperature while providing means for varying the period of exposure of dishes thereto and removing the same after the selected period of exposure. A further object is to provide an improved heater structure having important new advantages which will be described more specifically hereinafter.

The invention is shown in an illustrative embodiment by the accompanying drawing, in which—

Figure 1 is a perspective view of dish-heating apparatus embodying my invention; Fig. 2, a perspective view of the dish removal and assembly mechanism; Fig. 3, a sectional view, the section being taken as indicated at line 3—3 of Fig. 1; Fig. 4, a detailed sectional view, the section being taken as indicated at line 4—4 of Fig. 3; and Fig. 5, an enlarged broken vertical sectional view of the dish-heater structure. the section being taken as indicated at line 5—5 of Fig. 3.

In the illustration given, I provide a cabinet 10 providing a motor chamber 11 and a heater chamber 12. About the heater chamber particularly, I provide insulation 13, the front wall 14 being interrupted and spaced from the lower wall to provide an entrance port 15. The upper wall of the heater cabinet portion is provided with a vent 16, and a thermometer gauge 17 is provided with a heat-responsive portion extending downwardly through a well and into the chamber 12, thus correctly indicating at all times the temperature prevailing within chamber 12.

Any suitable means for heating the dishes may be provided within chamber 12. In the specific illustration given, I provide a gas manifold 18, from which extend laterally burner tubes 19. The burner tubes 19, as shown more clearly in Fig. 4, are provided with laterally-extending ports 20, through which gas escapes for forming the flame. Between the burner tubes 19 and extending laterally thereof, are ceramic structures 21, having depending points 22. The points 22 become red-hot under the influence of the flame and provide in excellent source of infra-red rays. The burner tubes 19 may be rectangular or square in cross-section, if desired, or of any other suitable shape. Further, any other suitable source of infra-red rays may be employed, or any type of heater which is effective in charging the heat-resistant dishes with the desired quantum of heat may be employed.

In the lower portion of the heating chamber 12 is mounted a conveyor in the form of a turntable 23, a portion of the turntable preferably extending forwardly of the casing 10 and through the entrance port 15. The turntable is mounted upon a flange-equipped collar 24, which in turn is supported by a shaft 25. A closure flange 26 may be secured to shaft 25 for sealing the shaft opening 27a in the lower wall of the heater cabinet. The lower end of shaft 25 is mounted within a bearing 27 supported upon the bottom wall 28 of the structure 10.

Any suitable means for rotating shaft 25 may be employed. I prefer, however, to employ mechanism which enables the speed of rotation of the shaft to be regulated in a very simple manner. In the illustration given, the shaft 25 is fixedly provided with a collar 28a equipped with a driven disc 29. A motor 30 drives through reduction gears within the casing 31 a drive-shaft 32, upon the end of which is mounted a frictional drive wheel or disc 33. Preferably the shaft 25 is movable vertically to a slight extent and the weight of the shaft and disc 29 causes the drive disc 33 to firmly engage the lower surface of the driven disc 29.

In the specific illustration given, I provide means for shifting the motor 30 and its drive-shaft 32 bodily so as to bring the drive disc 33 into different radial positions with respect to the driven disc 29 for thus varying the speed of rotation of disc 29 and shaft 25. In the illustration given, the motor 30 is mounted upon a platform 34, which is slideably carried upon guide shafts 35, the shafts being mounted upon a bracket frame 36. Centrally mounted within the frame 36 is a screw shaft 37 equipped at its forward end with a handle-equipped wheel 38. The screw 37 extends through the nuts 39, which engage the shiftable platform 34. Thus when the screw shaft 37 is rotated, the platform and the motor 30 are thereby shifted rearwardly or forwardly, depending upon the direction of rotation of screw 37. I preferably secure to one of the nuts 39 a depending indicator arm 40 which is adapted to be brought into line with a scale 41 mounted upon the bottom wall 28 of the cabinet 10. The scale 41 is preferably provided with spaced lines provided with appropriate indicia indicating the number of dishes which will be treated per hour at the particular setting to which the indicator arm points. For example, adjacent one of the lines may appear the numerals "240," thus indicating that 240 dishes will be heated per hour with the drive disc 33 in the position selected. Other lines may indicate 300, 360, 420, 480, etc., dishes heated per hour.

The lower chamber 11 of the cabinet may be equipped with doors 42, as shown more clearly in Fig. 1.

Assuming that the driving means has been adjusted to expose dishes for the desired period of time to the heating means, it is now important that means be provided which will remove a dish immediately after the desired quantum of heat has been chargd therein and to immediately assemble the dish with an insulated container bottom so that the charged heat of the dish may be utilized in warming the insulated container while at the same time enabling the operator to support the highly heated dish without bringing his hands into contact therewith as he supplies the container bottom and its dish to the packing table.

In the illustration given, I provide a bracket member 43 equipped with an attachment flange 44 and with a forwardly-extending V-shaped support 45. The forward end of the support 45 is preferably provided with a retainer guard 46.

Near the inner portion of the support 45 is a pair of vertically-extending posts 47 and 48. The post 47 is provided at its top with an integral inwardly-extending guide-arm 49, the arm extending in a curved direction and extending inwardly and laterally over the turntable 23. The arm 49 is adapted to engage the heat-resistant dish 50 and to guide it away from the turntable 23. Supported upon the posts 47 and 48 is a platform 51 having its top surface substantially flush with the top surface of the turntable 23 but having its forward surface cut away along an arcuate line 52, as shown more clearly in Fig. 2.

The attachment wall 44 of bracket 43 is provided with inverted key openings 53, adapted to engage headed studs or screws 54 with which the bottom wall of the heater chamber is provided so as to lock the bracket structure 43 firmly upon casing 10.

The insulated container bottom may be of any suitable construction. In the illustration given, it comprises an outer casing 55 of stainless steel or other suitable material, an inner casing 56 of similar material, and insulation therebetween, a resilient gasket 57 being provided at the upper end of the contained bottom. This structure is described in considerable detail in my said co-pending application, Serial No. 757,841.

*Operation*

In the operation of the structure shown, the heater chamber 12 is brought to the desired temperature as indicated on the thermometer 17. The wheel 33 is then rotated to drive the shaft 25 and table 23 through the disc 29 at the desired speed. The operator inserts dishes 50 upon the table 23 as it rotates, so that they will be charged with the desired amount of heat. He also places a container bottom upon the support 45 with the rear end of the container bottom extending under the platform 51, as shown more clearly in Fig. 2. With this arrangement, the arcuate edge 52 of the platform 51 is substantially aligned with the curved inner surface of the container bottom. When the dish 50, after being heated, reaches its discharge point, the curved arm 49 comes into contact with the dish and guides it laterally upon the platform 51 and as the dish moves outwardly under its momentum, it is guided onto the insulated container bottom, the inwardly-curved edge 52 causing the dish to dip downwardly as it approaches the container bottom and to slide evenly thereinto. In this operation, the arcuate edge 52 serves as a guide for centering the dish within the container bottom.

The operator next removes the container bottom with the heated dish therein, and places the same on a packaging table line for further processing, as described more fully in my co-pending application, Serial No. 757,841.

In the foregoing operation, the driver's hands are guarded against injury by the structure shown, in which the friction wheel drive moves the dish support 23, as shown more clearly in Fig. 1 of the drawings.

The dish heater structure, whether employed with or without mechanisms for moving the dish into the infra-red heating zone, includes both gas-fired and electrically-heated structures. It will be understood that any source of heat effective for the charging of the dishes with the required quantum of heat may be employed.

While in the foregoing specification, I have set forth a specific structure in considerable detail for the purpose of illustrating an embodiment of the invention, it will be understood that such details of structure may be varied widely by those skilled in the art without departing from the spirit of my invention.

I claim:

1. In dish-heating apparatus, a cabinet providing a heater chamber with an opening along one side, a heater supported in said chamber, means in said chamber for moving dishes under said heater, a support carried by said cabinet adjacent said opening and adapted to receive thereon an insulated container open at its top, said support being provided with a platform having its top surface substantially flush with said means, and an inclined arm carried by said support and extending over said means for directing a dish from the means onto said platform and into said container.

2. The structure of claim 1, in which said platform is provided with an inwardly-curved and recessed forward edge.

3. In dish-heating apparatus, a cabinet providing a heating chamber open on one side and a motor chamber therebelow, a turntable mounted in the lower portion of said heater chamber, a shaft supporting said turntable and extending downwardly into said motor chamber, motor-operated means for rotating said shaft, a heater mounted in said heater chamber above said turntable for directing infra-red rays downwardly upon dishes supported by said turntable, and a container support adjacent the opening of said heater chamber for receiving a heated dish as it is removed from said turntable, said container support providing a platform substantially flush with the top of said turntable and being adapted to receive a dish therefrom and an outwardly-extending support therebelow adapted to support a container into which a dish is moved from the platform.

4. In dish-heating apparatus, a cabinet providing a heating chamber open at its forward side and a motor chamber therebelow, a shaft rotatably supported in said motor chamber and extending into said heating chamber, a turntable mounted on said shaft, motor means in the motor chamber for driving said shaft at variable speeds, said turntable extending through the opening of said heater chamber to provide an accessible portion thereof outside of said chamber, a support at one side of said opening and carried by said cabinet, said support being provided with a platform having its top surface substantially flush with the top surface of said turntable and being adapted to receive thereon an insulated container open at its top and with one portion of the container extending under said platform, and an inclined remover arm carried by said support and extending inwardly over a portion of said turntable for engagement with a dish thereon to direct said dish onto said platform and into said container.

5. In dish-heating apparatus, a cabinet providing a heating chamber open at its forward side and a motor chamber therebelow, a shaft rotatably supported in said motor chamber and extending into said heating chamber, a turntable mounted on said shaft, motor means in the motor chamber for driving said shaft at variable speeds, a support at one side of said opening and being carried by said cabinet, said support being provided with a platform having its top surface substantially flush with the top surface of said turntable and being adapted to receive thereon an open-topped container having a portion thereof extending below said platform, and an arcuate remover arm extending inwardly over a portion of said turntable for engagement with a dish thereon to direct the dish onto said platform and into said container.

6. In dish-heating apparatus, a cabinet providing a heater chamber, a heater mounted in said chamber, a turntable mounted in said chamber for supporting dishes adjacent said heater, means for rotating said turntable including means for selectively varying the speed of rotation of said turntable whereby the amount of heat absorbed by said dishes is controlled and each dish is heated uniformly, said heater chamber being provided with an opening, a support adjacent said opening and being equipped with a platform having its top surface substantially flush with said turntable, and an angular and relatively stationary arm extending over said turntable for intercepting and directing a dish from the turntable and onto said platform.

(References on following page)

References Cited in the file of this patent

UNITED STATES PATENTS

| Number | Name | Date |
|---|---|---|
| 712,659 | Donnatin et al. | Nov. 11, 1902 |
| 1,067,152 | Stagner | July 8, 1913 |
| 1,543,212 | Kurrell et al. | June 23, 1925 |
| 1,599,556 | Cook | Sept. 14, 1926 |
| 1,643,650 | Williams | Sept. 27, 1927 |
| 1,907,116 | Jenkins | May 2, 1933 |
| 2,372,362 | Dawson | Mar. 27, 1945 |
| 2,438,699 | Groetchen | Mar. 30, 1948 |

FOREIGN PATENTS

| Number | Country | Date |
|---|---|---|
| 426,178 | Germany | Mar. 2, 1926 |